June 9, 1931.  E. S. SAVAGE  1,809,358
MOLDING MACHINE
Filed Feb. 23, 1928   10 Sheets-Sheet 1

INVENTOR
Edward S. Savage
BY
his ATTORNEY

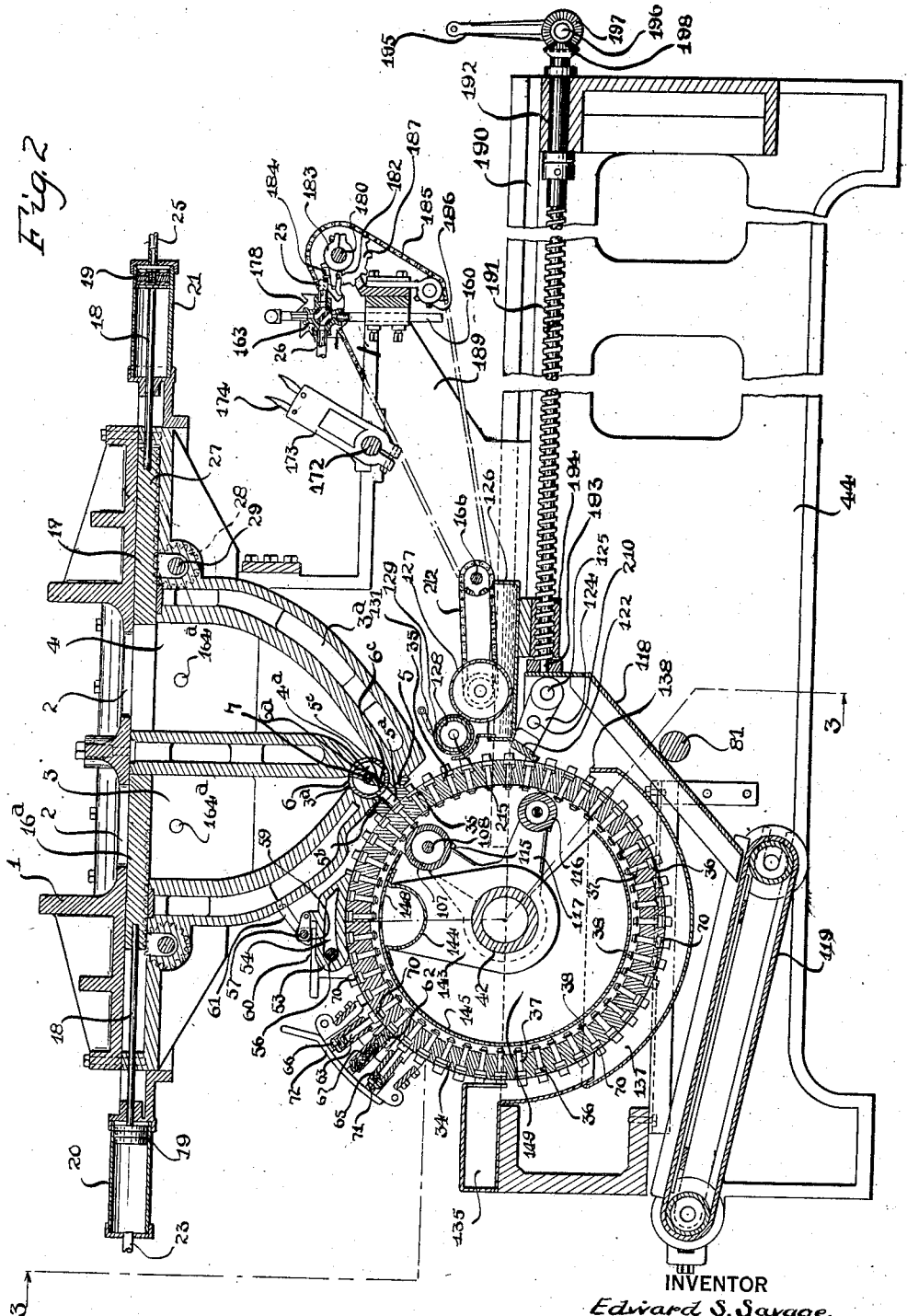

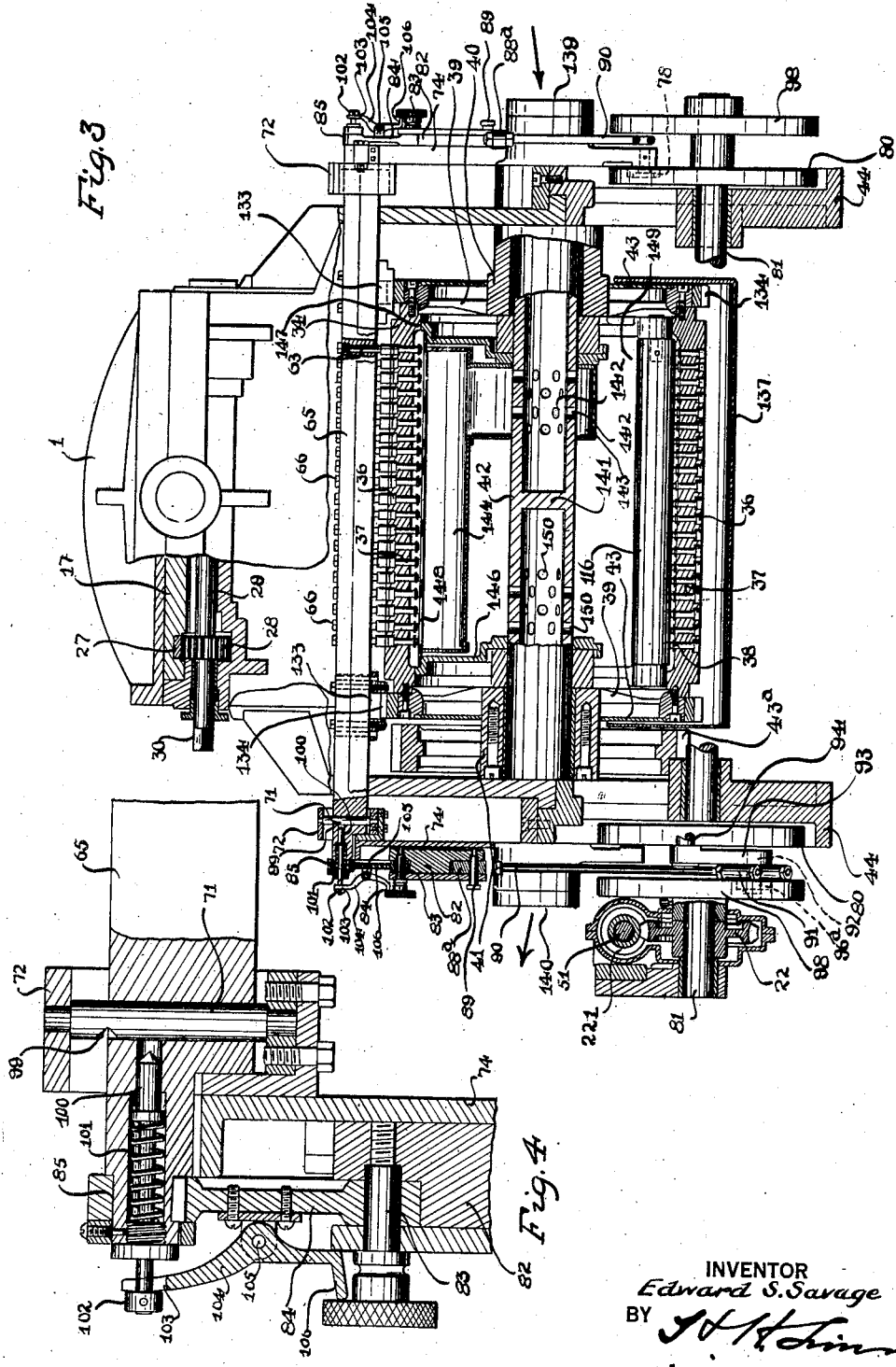

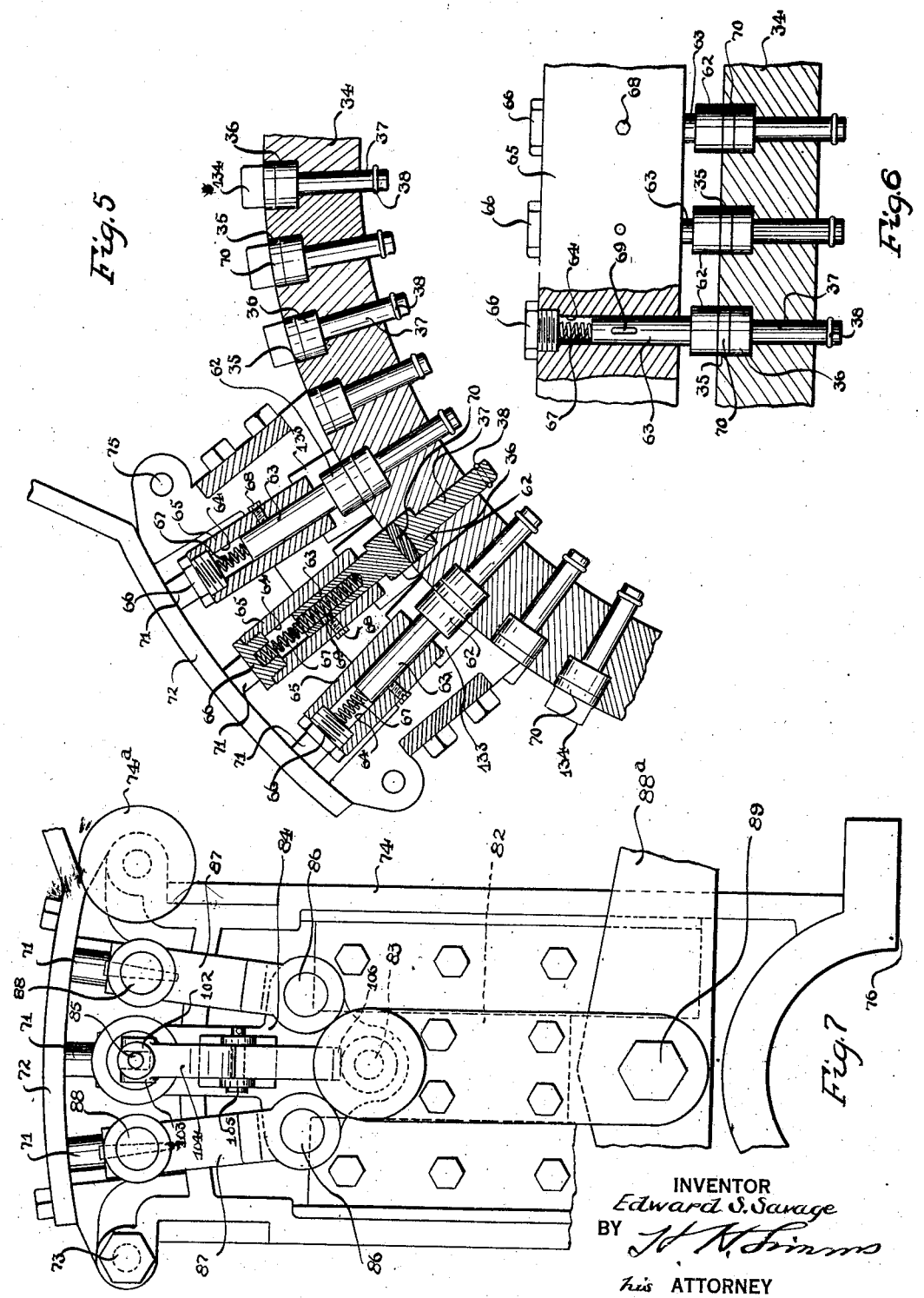

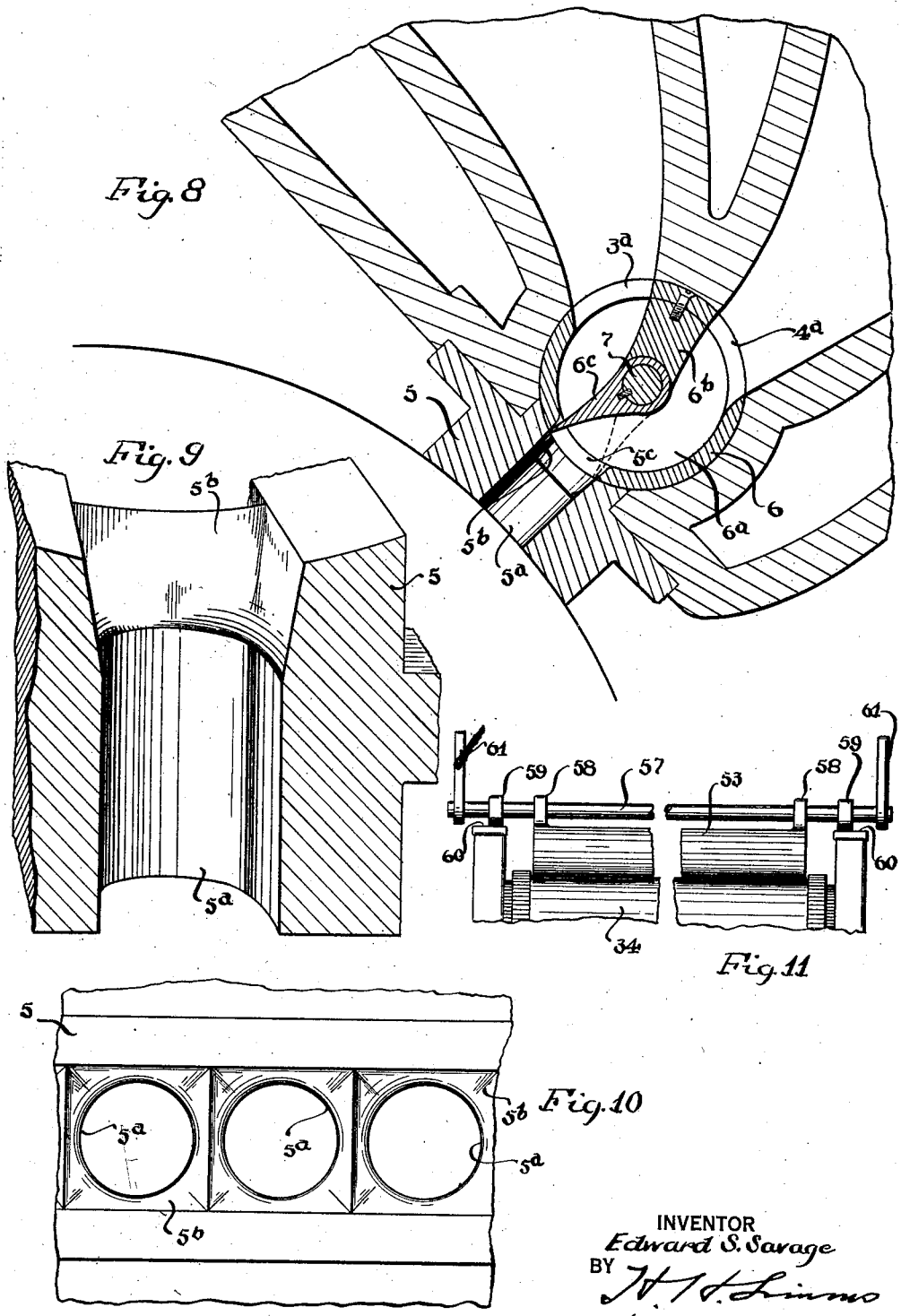

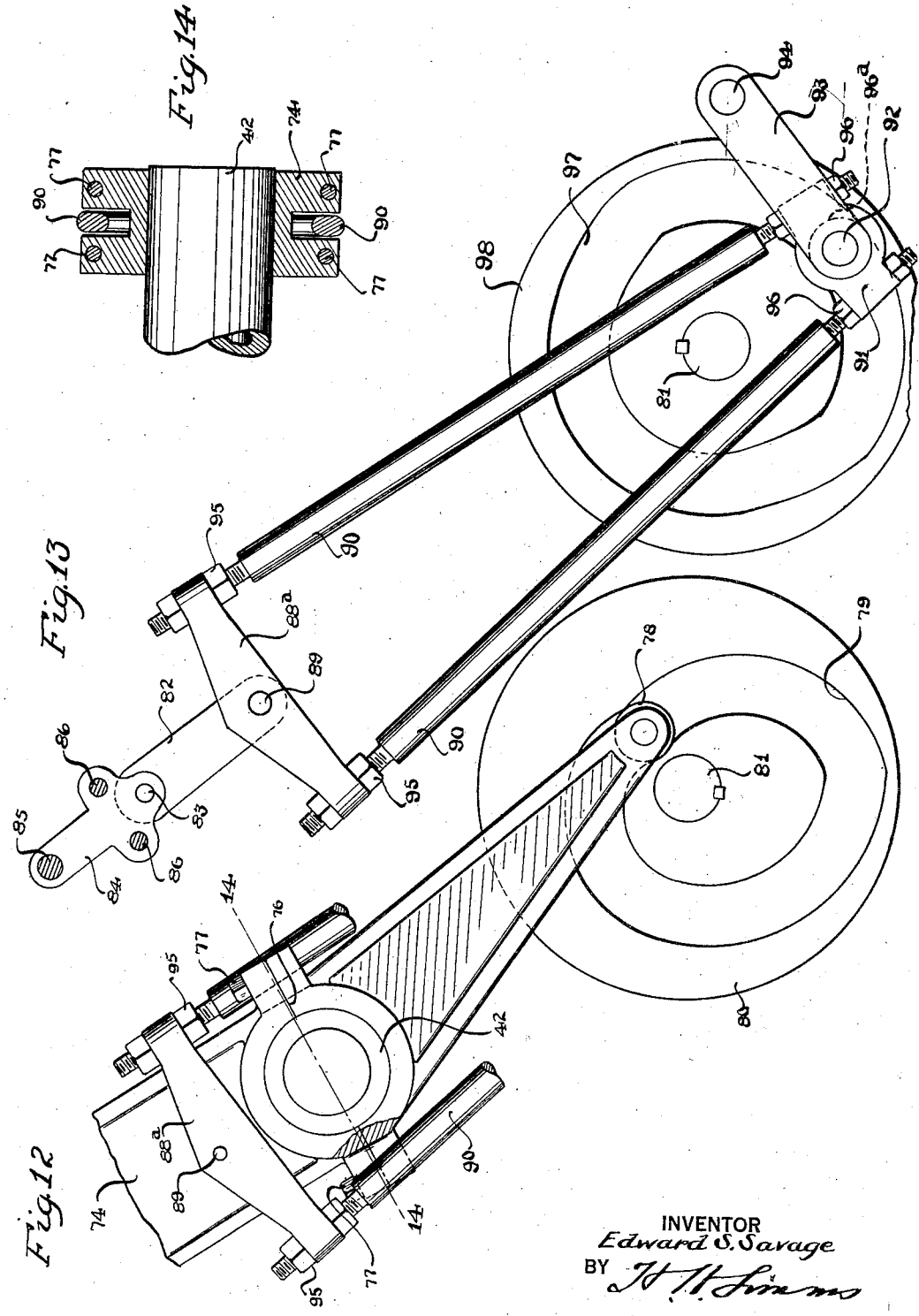

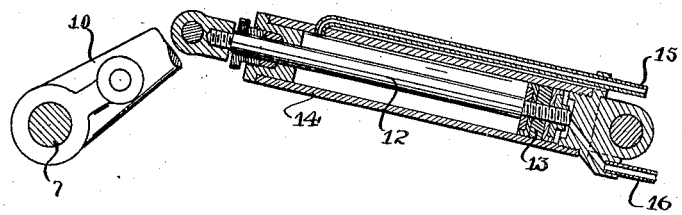
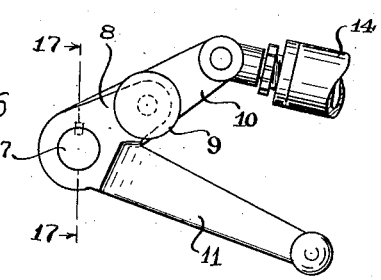
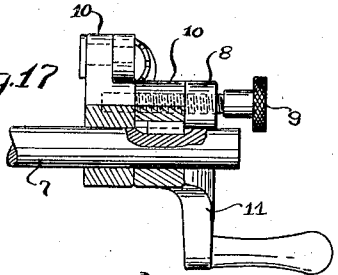
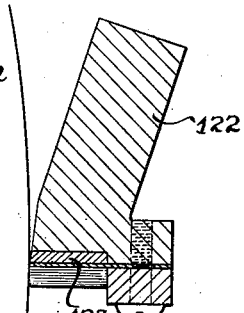
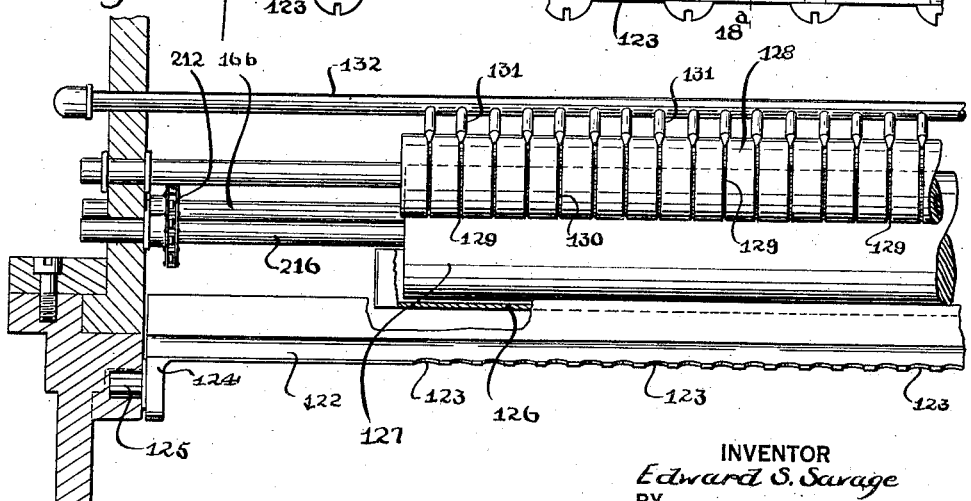

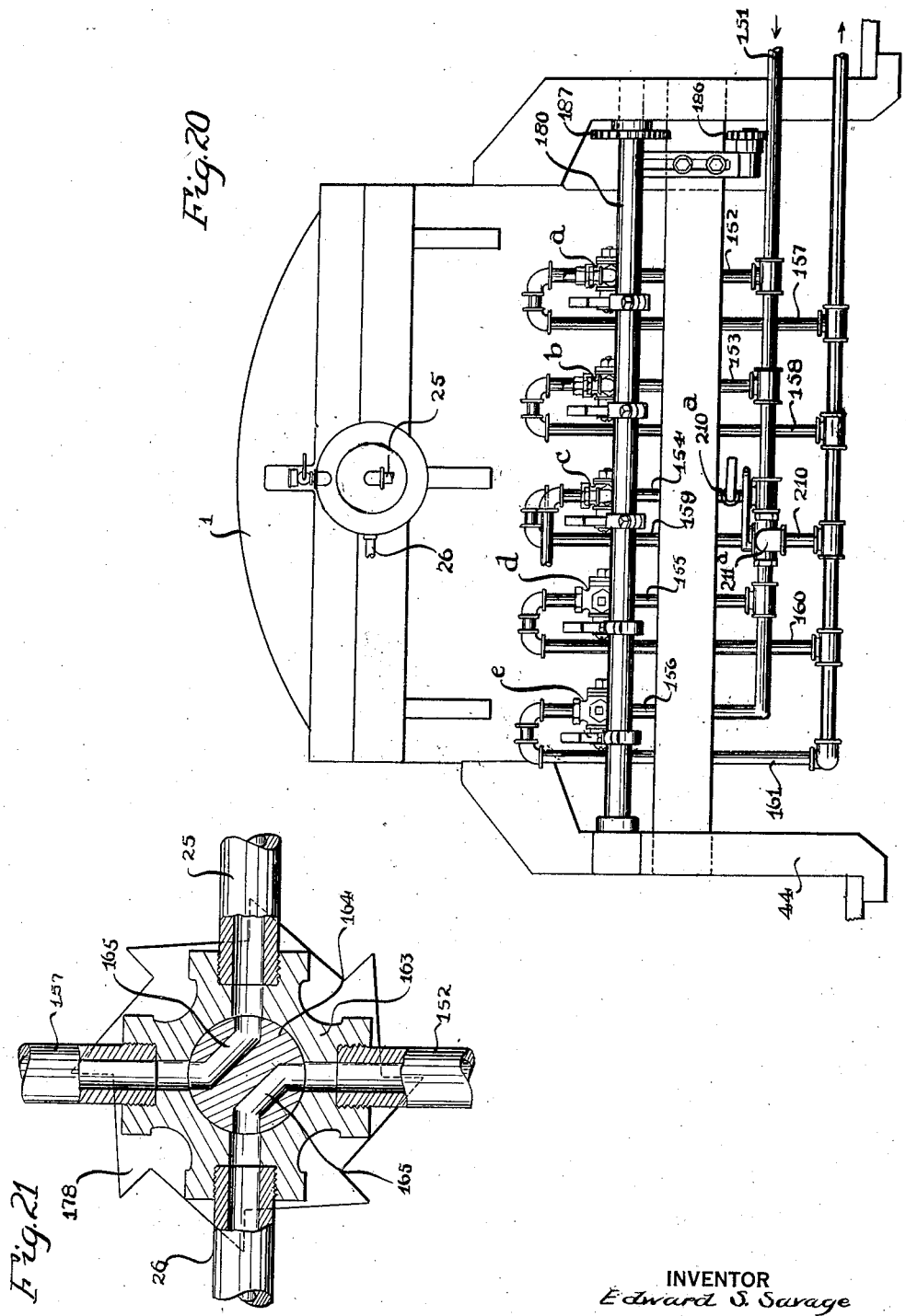

June 9, 1931. E. S. SAVAGE 1,809,358
MOLDING MACHINE
Filed Feb. 23, 1928 10 Sheets-Sheet 9

INVENTOR
Edward S. Savage
BY
his ATTORNEY

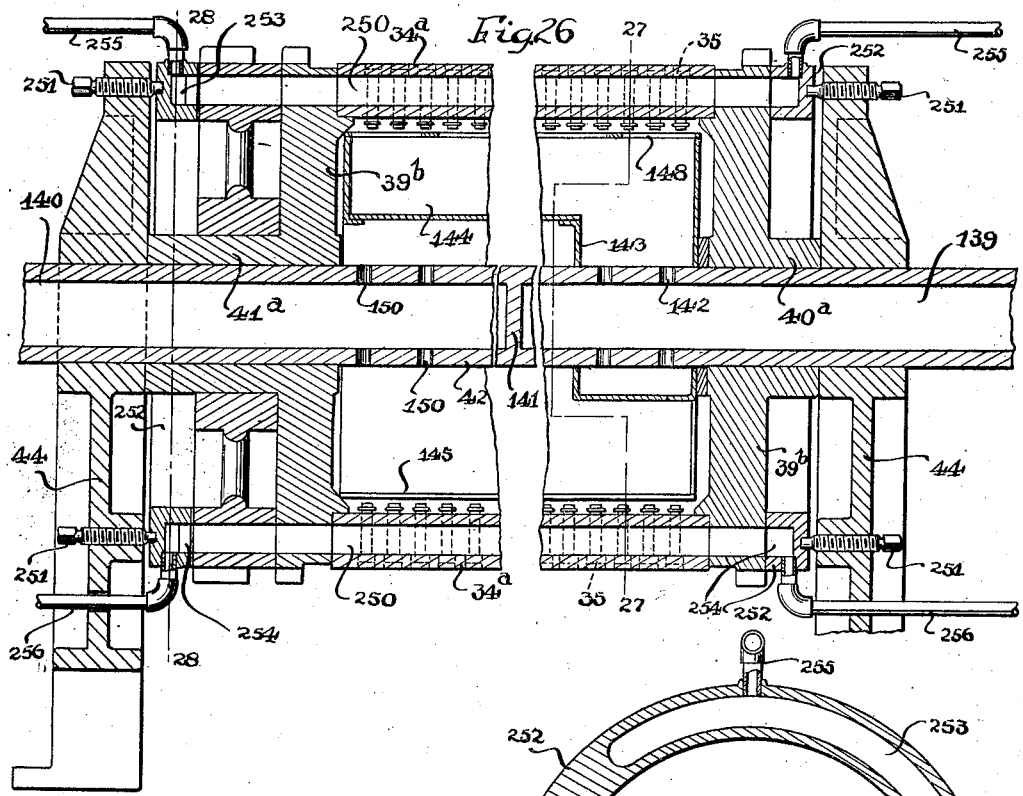
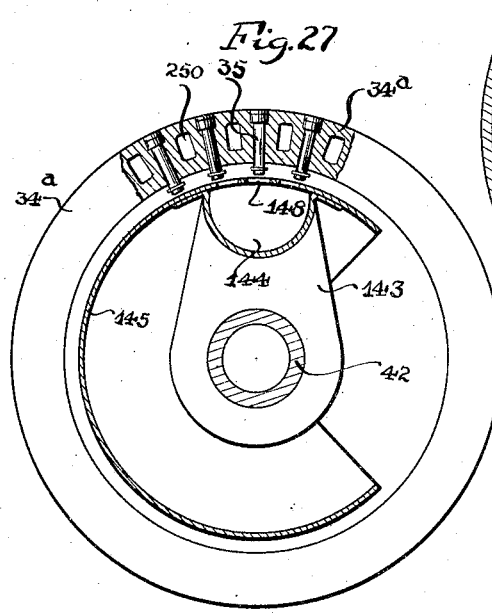
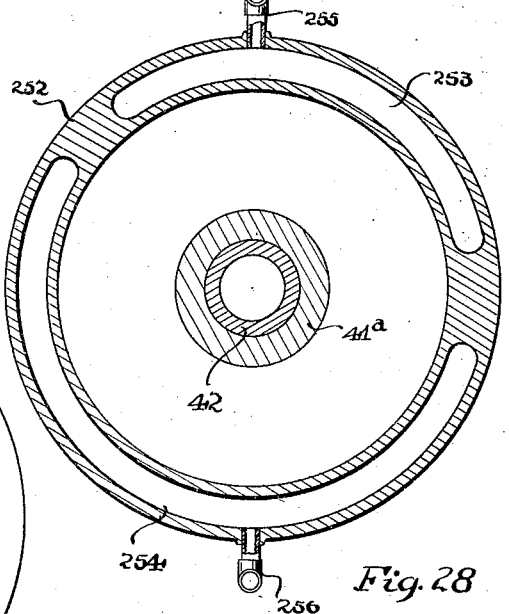

Patented June 9, 1931

1,809,358

UNITED STATES PATENT OFFICE

EDWARD S. SAVAGE, OF ROCHESTER, NEW YORK

MOLDING MACHINE

Application filed February 23, 1928. Serial No. 256,279.

The present invention relates to molding machines and more particularly to the type designed for molding candy pieces, lozengers, pills, wafers and other small bodies. An object of this invention is to provide a construction which will make it possible to turn out such molded small bodies in large quantities and at a minimum expense. Another object of the invention is to provide a continuous feed under pressure of the material to be molded. A further object of the invention is to provide a feeding mechanism having a plurality of feeding chambers common to a single feeding means leading to the mold carrier, means being provided for automatically connecting said chambers, one at a time, with the feeding means. Still another object of the invention is to provide a feeding mechanism having two feeding chambers connecting by a single feeding means with a mold carrier with automatic means for effecting pressure on the material in said chambers, one at a time, to force said material from the chambers into and through the feeding means, there being also provided automatic means which will connect with the feeding means that feeding chamber having its contents subject to pressure. A still further object of the invention is to provide a novel pressure applying means for applying pressure to the material in the molds of the mold carrier. Still another and further object of the invention is to provide a novel means for producing a preliminary heating of the mold carrier. A still further object of the invention is to provide a novel means of cooling the mold carrier. Another and still further object of the invention is to provide a novel means for adjusting the amount of material to be fed to the mold pockets. Still another and further object of the invention is to provide a novel stripper for removing the molded articles from the mold carrier after they have been ejected from the molds. A still further object of the invention is to provide a novel means for oiling the mold carrier. Another object of the invention is to provide a novel controlling means for the valves employed in the machine. A further object of the invention is to provide for separating the feeding mechanism from the mold carrier to permit ready cleaning of the latter.

To these and other ends, the invention consists of certain parts and combinations of parts all of which will be hereinafter described: the novel features being pointed out in the appended claims.

In the drawings:

Fig. 2 is a vertical section through the machine;

Fig. 3 is a section on the line 3—3, Fig. 2 with parts in elevation;

Fig. 4 is a detail view showing the mounting of one end of a presser carrying crosshead with the means for holding the crosshead against movement on its guide;

Fig. 5 is a fragmentary sectional view of the mold carrier and the pressure applying means for the material in the molds;

Fig. 6 is a fragmentary detail view, partially in section, showing the pressers cooperating with the molds of the mold carrier;

Fig. 7 is a fragmentary side view of the oscillatory frame upon which the pressers are supported;

Fig. 8 is an enlarged fragmentary sectional view showing the cooperation between the feeding mechanism and the mold carrier;

Fig. 9 is a fragmentary perspective view of the throat plate of the feeding mechanism;

Fig. 10 is a fragmentary view of the throat plate;

Fig. 11 is a broken detail view of the preliminary heater for the mold carrier;

Fig. 12 is a detail view showing the manner in which the oscillatory frame is moved;

Fig. 13 is a detail view showing the manner in which the presser carriers are reciprocated;

Fig. 14 is a section on the line 14—14, Fig. 12;

Fig. 15 is a fragmentary sectional view showing the manner in which the feed valve is operated;

Fig. 16 is a fragmentary view of the feed valve operating mechanism;

Fig. 17 is a section on the line 17—17, Fig. 16;

Fig. 18 is a view of the stripper from the side that cooperates with the mold carrier;

Figure 1:
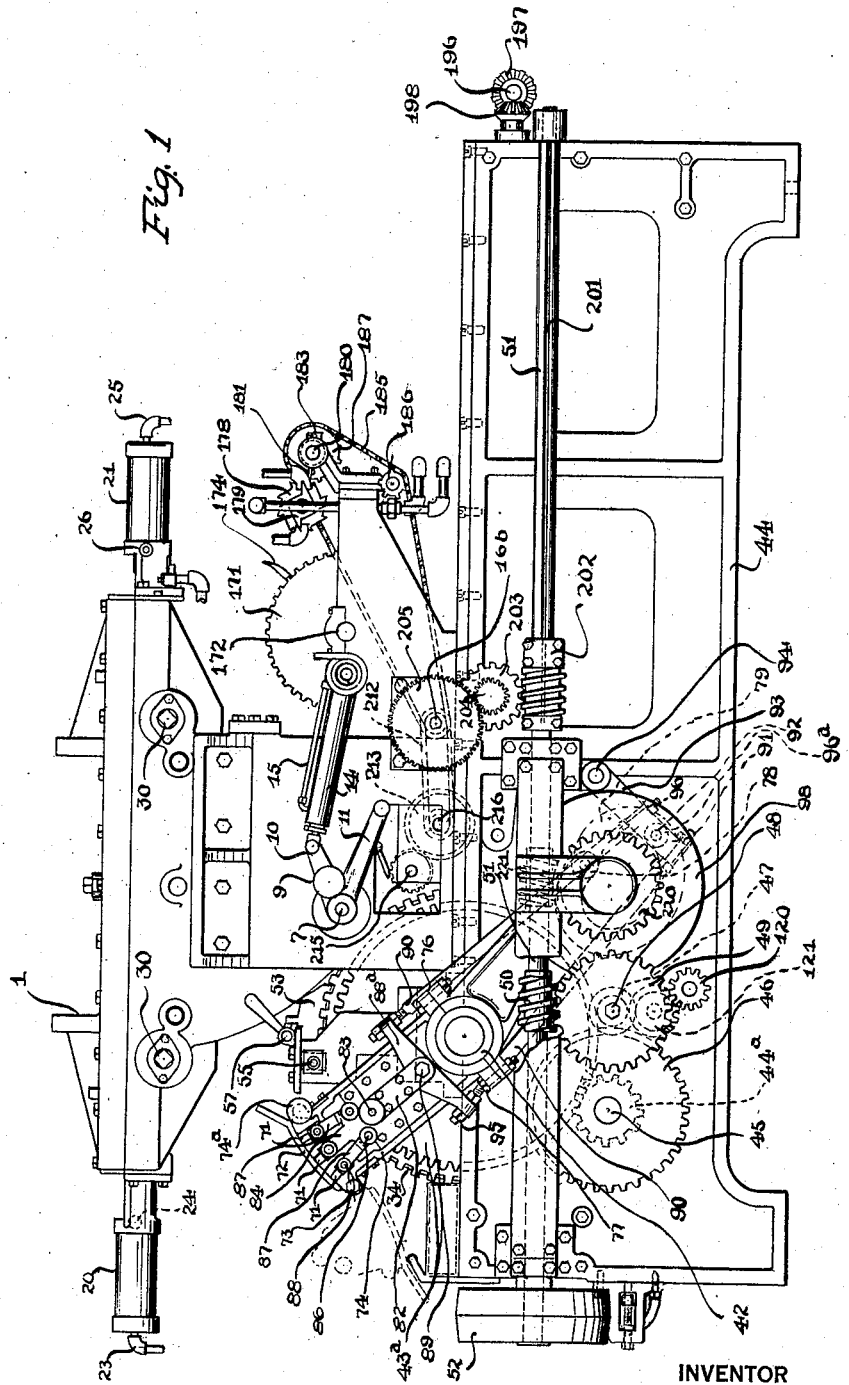
Fig. 1 is a view of one side of a machine constructed in accordance with this invention.
Figure 22:
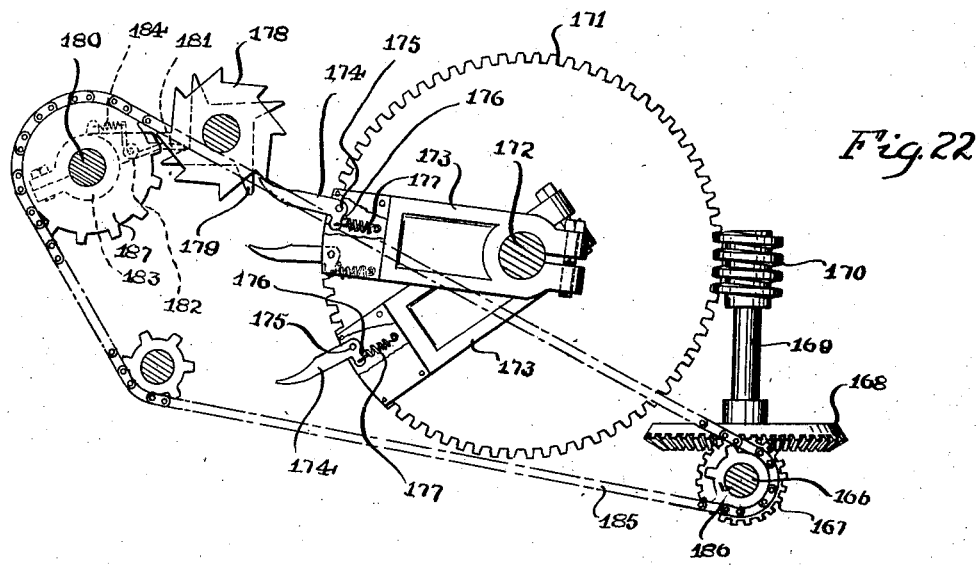
Figures 23, 25:
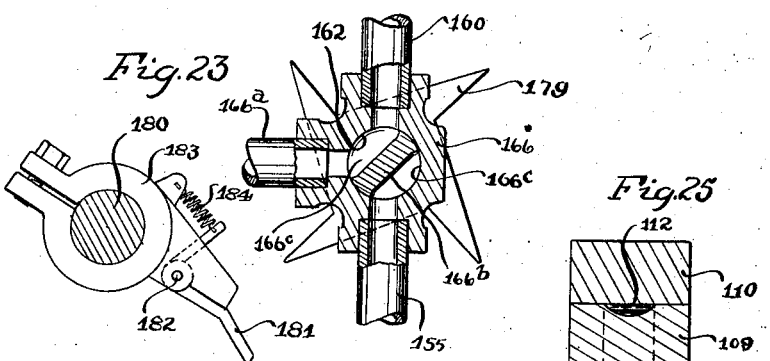
Figure 24:
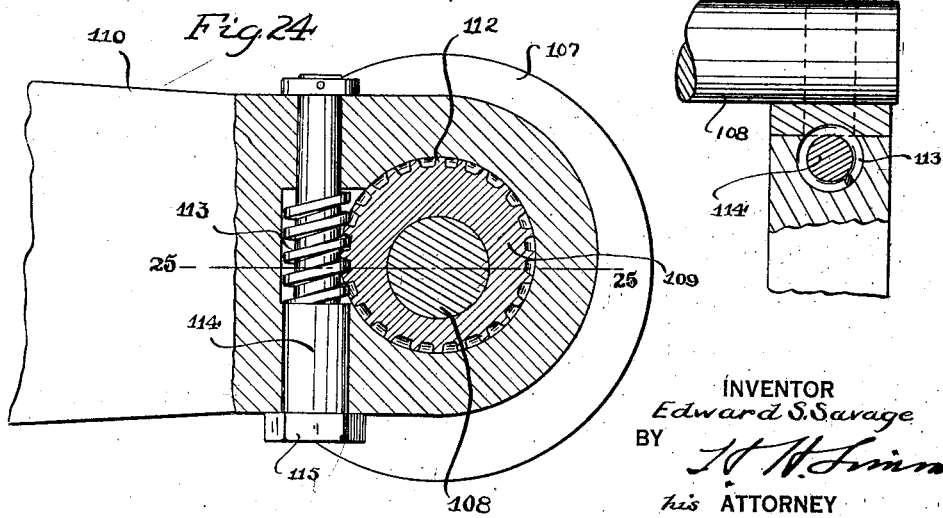

Fig. 18$^a$ is a sectional view on the line 18$^a$—18$^a$, Fig. 18;

Fig. 19 is a fragmentary view, partially in section, of the oiling mechanism and the stripper;

Fig. 20 is a fragmentary view showing in elevation the controlling mechanism for the valves employed in the apparatus;

Fig. 21 is a sectional view of one of the controlling valves of said controlling mechanism;

Fig. 22 is a fragmentary view showing the means by which the controlling valves of the controlling mechanism are operated;

Fig. 23 is a sectional view of another of the controlling valves which control the feeding mechanism;

Fig. 24 is a detail sectional view showing the manner in which the ejector roller and the gaging roller, for determining the amount of material fed to the mold pockets, are adjusted;

Fig. 25 is a section on the line 25—25, Fig. 24;

Fig. 26 is a sectional view through the mold carrier of another embodiment of my invention illustrating another means of changing the temperature of the mold carrier;

Fig. 27 is a section on the line 27—27, Fig. 26; and

Fig. 28 is a section on the line 28—28, Fig. 26.

In the present embodiment of the invention which is designed for making hard candy, the machine is continuous in its operation. The material in a heated condition is fed by a continuous flow to a series of molds traveling in an endless path past the discharge passage of the feeding mechanism. While the material is moving with the endless series of molds, it is subjected to a pressure applying means which operates through the open faces of the molds. After pressure has been applied to material, the latter while moving with the molds is subjected to a cooling action, after which it is ejected from the molds and the molds are oiled and again presented to the feeding mechanism.

The feeding mechanism for the material to be molded embodies, in this instance, a hopper 1 communicating through openings 2 with the two feed chambers 3 and 4 held in a heated condition by steam passed through the hollow wall 3$^a$ of the feed chambers. These feed chambers, in this instance, connect by a common feeding means with the mold carrier.

The common feeding means for the two feed chambers comprises, in this instance, a face plate 5 secured to the casting in which the feeding chambers are formed and having, in this instance, a plurality of feeding passages, the outermost portions 5$^a$ of which may correspond in cross-sections of the molds to which the material is fed, being, in this instance, of circular cross-section. The inner portions of these passages taper at 5$^b$ so that the inner ends become rectangular in cross-section. These passages communicate through a slot 5$^c$ formed in a tube 6 which is introduced transversely through the casting in which the chambers 3 and 4 are formed and have a slot 3$^a$ and a slot 4$^a$, so that both feeding chambers 3 and 4 will communicate with the interior of the tube 6 and through the latter with the passages in the feeding plate 5. Within the tube are arranged two disks 6$^a$, which are positioned at opposite ends of the tube and close the tube to the exterior of the machine and at the same time provide bearings for a shaft 7 which supports a valve member 6$^c$ operating in the tube. Also secured in the tube by screws 6$^e$ is a longitudinally extending partition 6$^b$. This partition 6$^b$ has its inner end curved to conform to the curved portion of the valve 6$^c$ adjacent the shaft so as to provide two passageways on opposite sides of the valve 6$^c$ and leading to the slot 5$^c$. The valve 6$^c$ in one of its positions closes one of the tube passageways and opens the other passageway through the slot 5$^c$ and vice versa. It will be noted that the valve 6$^c$ when opening either of the chambers 3 or 4 to the passageways in the feeding plate 5 provide substantially an unbroken channel so that it is impossible for the material to lodge at any point in the channel for it has been found that, when candy is permitted to lodge at anyone point, it crystallizes and this crystallization is communicated to all candy coming in contact therewith. It is undesirable to deliver the candy to the molds in a crystallized condition.

When the candy is in a soft condition, and pressure is exerted on the candy mass in either one of the chambers 3 and 4, the valve member 6$^c$ will, under said pressure, shift or open up a passage through the tube 6 from said pressure receiving chamber to the passageways in the feeding plate 5, so that pressure alternately communicated to the chambers 3 and 4 will automatically shift the valve 6$^c$ to open up communication between the pressure receiving chamber and the molds. However, when the candy is beyond a certain stiffness one way or the other, this automatic action of the valve 6$^c$ is not positive, and to this end there may be employed in connection with the valve 6°, a positive actuating means to effect its oscillation.

Any suitable means may be employed for effecting the oscillation of the feeding valve. In this instance, the shaft 7 of the valve has an arm 8 keyed thereto and carrying an adjustable screw 9 which is adapted to be connected to and disconnected from an arm 10 which is mounted to turn on the shaft 7 so that the shaft 7 may swing with the arm 10 or be turned independently thereof by a crank arm 11. This crank is provided in order that the valve 6° may be turned by hand. Movement of the arm 10 may be effected by a plunger 12 carrying a piston 13 operated in a cylinder 14 to the opposite ends of which the pipings 15 and 16 are connected so that a fluid may be entered into either end of the cylinder while being exhausted from the opposite end. This valve operating mechanism is illustrated in detail in Figs. 15, 16 and 17.

To the end of feeding the material through the feed passage by a continuous flow, the material in the chambers 3 and 4 is alternately subjected to pressure, in any suitable manner, which is applied to one and withdrawn from the other as the former is opened by the valve 6° to communication with the feeding passages 5ª and the latter is closed to said passages. In this instance, the feeding chambers 3 and 4 are provided with valves 16ª and 17 between the chambers and the hopper 1. As illustrated, these valves are slidably mounted at the tops of the feeding chambers and are connected by rods 18 with pistons 19 operating in cylinders 20 and 21, the former controlling the charging valve 16 of the feeding chamber 3 and the latter controlling the charging valve 17 of the feeding chamber 4. The cylinder 20 has pipings 23 and 24 leading to opposite ends thereof, while the cylinder 21 has pipings 25 and 26 leading to opposite ends thereof. The fluid is so controlled that one of the slide valves 16 or 17 opens after the other closes. In order that these slide valves 16 and 17 may be controlled by hand, each is provided on its underside with racks 27 with which gears 28 mesh. These gears 28 are arranged on a shaft 29 to which a crank handle may be secured at 30 so as to operate the valves 16 and 17 independently of their fluid operated controlling means. These gears 28 with their racks 27 also act to prevent any binding action of the slide valves 16 and 17 with their guides.

From the feeding mechanism, the material is fed to the molds which travel past the feeding passages 5ª in an endless path. In this instance, the molding chambers are in the form of pockets 35 in the outer face of a hollow drum 34 which is supported for rotation so that the periphery is engaged by the feeding plate 5, the latter being curved on its outer face to conform to the periphery of the drum 34. The pockets 35 are arranged in parallel transversely extending rows, each pocket of each row being in line with a pocket or mold in adjacent rows. Each mold pocket preferably has a movable bottom wall 36 from the underside of which projects a plunger 37 which is guided in the hollow drum 34 and projects from the inner periphery of said drum where it is surrounded by a split ring 38 serving to hold the bottom member 36 in the pocket. This drum may be supported at opposite ends by spiders 39 which are secured to two bearings 40 and 41 mounted to turn on a hollow shaft 42, plates 43 being secured to these spiders and serving to close the opposite ends of the mold drum or carrier. A gear 43ª secured to the bearing 41 receives motion from a suitable driving mechanism to turn the drum on the main frame 44 in order to carry the mold pockets 35 past the feeding passages of the feeding mechanism.

The driving mechanism for the drum or mold carrier may comprise a gear 44ª on a shaft 45 turning with a large gear wheel 46 which in turn meshes with a pinion 47 on a shaft 48. The latter in turn carries a worm wheel 49 which meshes with the worm 50 on a shaft 51 extending longitudinally of the main frame 44 and having a pulley 52 at one end through which the shaft 51 is driven.

As this particular embodiment of the invention is designed for using candy in a hot state, the heat from the candy will be transmitted to the mold carrier. However, before the machine is heated by the action of the hot candy, it is preferred to impart to the mold carrier a preliminary heating. One means for giving the mold carrier a preliminary heating comprises, a heating member 53 conforming to the surface of the drum or carrier 34 and having a heating chamber 54 arranged therein which is supplied with steam through a port 55. This heating chamber is mounted to swing at 56 so as to move the curved surface thereof into and out of engagement with the periphery of the mold carrier 34. This movement may be effected by a rock shaft 57 journalled in bearings 58 in the top of the heating member 53, said shaft carrying eccentrics 59 engaging surfaces 60 arranged on opposite sides of the preliminary heating device. On the shaft are crank handles 61 employed for turning the latter so that the eccentrics 59 move the heating element 53 toward and from the periphery of the mold carrier.

For cooperating with the candy in the pockets of the mold carrier in order to subject the candy to pressure and at the same time to give to the top faces of each candy in the molds a proper surface and contour, there may be provided dies or pressers 62.

In this instance, three rows of these pressers are provided, each row extending parallel with the axis of rotation of the mold carrier 34 or transversely of the line of movement of said mold carrier to cooperate with a transverse series of molds on the mold carrier. Each presser, in this instance, is mounted on a stem 63. The stems of each row or pressers 62 are guided in transverse bores 64 in a cross bar or presser carrier 65, there being three of said cross bars, in this instance, one for each row of pressers. The bores 64 are closed at their upper ends by adjustable plugs 66, and helical springs 67 abut these plugs and the bottom of pockets formed in the ends of the guides 63, thus yieldingly supporting the pressers 62 on the cross bars or carriers 65. Set screws 68 pass through the cross bars 65 intersecting the bores 64 thereof, and have their ends operating in slots 69 in the sides of the stems 63 to limit the movements of the pressers against the action of the springs. The plugs 66 are adjustable by being screw threaded so as to vary the tension on the springs 67, whereby, the pressure of the pressers 62 on the candy or material 70 arranged in the molds, may be varied.

The cross bar or presser carriers 65 are movable on lines which are radial to the axis of turning of the mold carrier 34, and, to this end, these cross bars 65 have transverse bores near opposite ends thereof through which extend guide pins 71, these guide pins being radial to the axis of turning of the mold carrier 34 and being provided two for each cross bar or presser carrier 65. The guide bars 71, in turn are supported on a frame 72 which is pivoted at 73 to a rocking or oscillatory frame 74 to be described. Hand screws 74ª pass through openings 75 in the frame 72 and also into openings in the frame 74. By removing these screws, the frame 72 may be swung on its axis 73 to carry the pressers from the mold carrier 34 in order to permit the cleaning of the pressers.

The oscillating frame 74 is employed in order that the pressers, after they engage the candy or other material in the molds, may travel with the mold carrier parallel with its line of movement in order to maintain such engagement until the proper action of the pressers on the candy or the material is obtained. In this instance, the frame 74 swings or oscillates about the shaft 42 as an axis so that the arc of movement of the frame 72 is concentric with the line of movement of the molds. In this instance, the arms of the frame 74 are divided into two parts at 76, the two parts being held together by bolts 77 about the shaft 42 upon which the frame 74 turns. Any suitable means may be employed for oscillating the frame 74 but, in this instance, those portions of the frame below the shaft 42 are provided with rollers 78 which operate in the cam grooves 79 in cam members 80 keyed to a shaft 81 which has a worm wheel 220 driven by a worm 221 on the shaft 51. It is apparent that the turning of the shaft 81 effects an oscillation of the frame 74 to carry the presser 62 first in the direction of rotation of the mold carrier and then in the opposite direction in order that the pressers may enter the next set of rows of molds.

The movement of the pressers toward and from the molds may be effected in any suitable manner. In the illustrated embodiment of the invention, slides 82 are guided on the oscillating frame and to these slides are pivotally connected, by pins 83, links 84 which also are pivoted at 85 to opposite ends of the central presser carrier 65. To each of the links 84 are pivoted at 86 two links 87, these links in turn being pivoted at 88 to the ends of the two outside presser carriers 65. Movement of the slides 82 may be effected by crossheads 88ª pivoted at 89 to the lower ends of the slides 82 and adjustably connected by rods 90 with crossheads 91 which are pivoted at 92 to links 93 in turn pivoted at 94 to a fixed part. The rods 90 have their ends adjustably connected at 95 and 96 respectively with the crossheads 88 and the crossheads 91. Rollers 96ª carried by the crossheads 91 operate in cam grooves 97 in cams 98 which are keyed to the shaft 81 before mentioned. It is apparent that with this arrangement, the oscillation of the frame 74 and the movement of the pressers toward and from the molds are effected from the single shaft so that it is possible to maintain a timed relation between these movements, this timed relation being effected through the cams 80 and 98. By adjusting the rods 90 on the crossheads 88 and 91, it is possible to adjust the field of movement of the punches, thus causing them to enter the mold chamber in a greater or lesser degree.

With the end in view of permitting detachment of the frame 72 from the presser operating mechanism so that the frame may be swung on its pivot 73, the pivots 83 for the links 84 are in the form of removable screws and, when withdrawn, permit the links 84 and 87 to swing with the frame 72. It is desirable that the presser carriers be held against movement on the frame 72 when the latter is swung on its frame 74 and, to this end, each of the guides 71 for the central presser carrier 75 is provided with a notch 99 for engagement by one of two spring pressed plungers or detents 100 which are guided on the central punch carrier 65 at opposite ends of the latter and are normally pressed toward the guides 71 by springs 101. The end of each plunger 100 projects from the punch carrier 65 and has an enlarged head 102 behind which the bifurcated end 103 of a lever 104 is adapted to engage, this lever being pivoted at 105 to the link 85 and having an end 106 positioned as to be engaged by the knurled enlarged head of the pivot screw 83. When the pivot screw is holding the link 84 to the slide 82, its head holds the plunger 100 withdrawn from the notch 99 but, with the removal of the screw 83 the plunger 100 moves into the notch 99 and holds the presser carrier 65 against movement on the frame 72.

So as to assure a proper alignment of each presser carrying bar 65 with a transverse row of molds on the mold carrier, each presser carrying bar carries on its underside centering guides or pockets 133 which are adapted to receive two annular series of centering guides or projections 134 formed at the opposite ends of the mold carrier. This centering or indexing means, insures against any misalignment of the pressers with the mold pockets while the pressers are traveling together in cooperative relation.

Assuming that material has been deposited in the molds of the mold carrier 34 and that the pressers 62 are positioned in spaced relation to the molds at the starting point of the movement of the carriage 72, the pressers, through the cams 98, start to move toward the molds in the mold carrier 34 at the same time the frame or carriage 72 starts a movement in the direction of movement of the mold carrier 34, the speed of the frame 72 being such that the axial positions of each row of pressers is the same as the axial positions of the molds on the mold carrier to be engaged by such pressers. Eventually, the pressers enter the molds with a yielding pressure and travel in engagement with the material in the molds until the proper molding action is obtained, when the pressers recede and the frame 72 moves in a direction the reverse of that of the mold carrier 34.

With the end in view of controlling the amount of the candy or material received by the molds, means is provided which limits the inward movement of the movable bottom walls 36 of each mold as they pass the feeding passages. This means, in this instance, comprises a gaging roller 107 having its shaft 108 journalled in rotary bearings 109, the bearings in turn being mounted to turn in arms 110 of two frames which are supported on the hollow shaft 42 at 111. The center of the shaft 108 is eccentric to the center of the rotary bearings 109 so that the turning of both the bearings 109 of the shaft 108 moves the limiting roller 107 toward and from the inner periphery of the mold drum 34 and controls the amount of material received in the mold pockets from the feeding mechanism. The turning of the rotary bearings 109 may be effected by providing said bearing with external worm teeth 112 with which may be engaged a worm 113 on a rotary shaft 114 journalled in an arm 110 and operated through a polygonally shaped end 115.

After the material has been compressed by the pressers, it travels in the molds to a point of ejection. The ejection is effected, in this instance, through a roller 116 which is rotatably supported by arms 117 from the frames 111. This roller engages the inner ends of the plungers 37 and pushes the bottom walls 36 of the molds outwardly, thus forcing the candy or material from the molds. As the candy passes from the molds, it drops on a chute 118 and is carried by the latter to an endless conveyor 119 which is driven by a gear 120 meshing with the gear 12, the latter being driven from the gear 47, hereinbefore mentioned. The conveyor 119 carries the material into any suitable receiving device.

So as to insure the displacement of the material from the mold carrier, there may be provided a stripping means comprising, in this instance, a bar 122 extending transversely of the mold carrier slightly beyond the point of ejection by the roller 116. This bar 122 has recessed in one edge conforming in part to the perimeter of the molding body and the recessed edges are covered at 123 with felt or other suitable resilient material. Over this resilient material is secured a thin flat strip of spring steel which is substantially pliable so as to utilize the effect of the resilient material beneath. This construction prevents the cracking of the candy pieces by the stripper. This stripping bar may be pivotally mounted so that it may be moved from the mold carrier to permit the cleaning of the latter. To this end, this bar has arms 124 extended rearwardly therefrom and pivotally mounted on the shaft 125. The stripping bar 122 is secured by removable bolts 210 so that it lies close to the perimeter of the mold carrier.

With the end in view of oiling the walls of the molding chambers to prevent the material sticking to the molds, a novel lubricating means or oiling means may be provided. This means, in this instance, comprises an oil or lubricating receptacle 126 supported to one side of the drum and having a peripheral pickup roller 127 turning therein. The roller 127 revolves on a shaft 216 and is operatively connected to a driven shaft 166 by an endless chain 212. A gear 213 on this shaft 216 drives a gear 214 on the shaft 215 which carries a roller 128. The rollers have peripheral contact so oil may be transferred from one to the other and are situated adjacent the periphery of the mold carrier. The surface of this roller 128 is formed with a plurality of parallel surrounding grooves 129 formed at intervals with interrupted portions 130. Arranged above the roller substantially tangentially thereto are nozzles 131, one for each groove, all receiving air from a common supply pipe 132. The air passed from these nozzles is directed against the oil in grooves 129 and tends to atomize such oil. The interrupted portions in the grooves serve to prevent the oil traveling in a circular path in the grooves, and assisting in the atomizing action. Each of these grooves is arranged opposite a circular series of molds on the mold carrier so that the main portion of the atomizing spray from each groove is directed at molds on the mold carrier as the molds pass the spray.

While the preliminary heating of the molding drum or mold carrier is desirable when the machine is employed for molding candy in a hot condition, yet, when the machine has been in use for a certain length of time, the mold carrier becomes heated to such an extent that a cooling thereof is desirable and particularly between the time the candy is relieved from pressure by the pressers and the time it is ejected from the mold carrier. With this object in view, a cooling means is provided comprising an air chamber 135 arranged transversely of the mold carrier adjacent the periphery thereof beyond the field of operation of the presser carriers. This chamber has a depending extension 136 conforming to the mold carrier and connecting with a pan 137 which also conforms to the mold carrier and extends about the underside of the latter to a point in proximity to the point of ejection where the pan is slightly restricted at 138 so that the air discharged from the cooling means is directed against the face of the drum in a strong stream and assists in cooling the candy or ejected material as the latter falls from the face of the mold carrier. The air chamber 135 with its extension is removable from the machine and the pan 137 which extends on opposite sides of the drum can be utilized for cleaning the mold carrier after a day's run by turning the latter in the pan while the latter is filled with a cleaning fluid. Instead of circulating cold air through the cooling system, hot air may be circulated so as to give the drum a preliminary heating instead of employing the preliminary heating chamber 54.

The foregoing arrangement only cools the exterior face of the mold carrier so, in order to cool the interior of the drum or mold carrier the shaft 42 is made hollow and is open at opposite ends, the end 139 providing the inlet and the end 140 providing the outlet. A partition 141 is arranged within the shaft to provide the same into two chambers, one communicating with the inlet and the other with the outlet. The shaft has openings 142 on one side of the partition 141 which communicate with a hollow arm 143 connecting with a chamber 144 on the inner side of the mold carrier opposite the preliminary heating device 53. This chamber 144 connects with an internal segmental drum 145 in close proximity to the inner periphery of the mold carrier, said drum also being supported by segmental flanges 146 which snugly fit the interior wall of the mold carrier at 147 on opposite sides of the molds so that an annular air chamber is provided in close proximity to the inner periphery of the mold carrier, said air chamber communicating by ports 148 with the air chamber 144 and discharging adjacent the ejecting device into a central chamber 149 of the hollow mold carrier. The air exhausts from the central chamber 149 in the mold carrier through the ports 150 in the hollow shaft 42 and out through the outlet 140. This cooling system may also be employed for heating the mold carrier. By the two cooling or heating devices one interiorly and the other exteriorly thereof, the mold carrier is maintained at the desired temperature.

With the end in view of controlling the feeding mechanism so that a continuous flow of material through the mold carrier is maintained, a novel controlling means for the valves of the feeding mechanism is employed. This controlling means comprises an air supplied piping 151 which connects by way of passages 152, 153, 154, 155 and 156 respectively with controlling valves $a$, $b$, $c$, $d$ and $e$. Each of these valves in turn connects by way of piping 157, 158, 159, 160 and 161 respectively with an outlet piping 62. The valves $a$, $b$ and $c$ are identical in construction and therefore only the valve $a$ will be described. This valve embodies a casing 163 having four ways, with one of which the piping 152 connects, another of which the piping 157 connects, another of which the piping 25 connects and the other of which the piping 26 connects. Within this valve casing is a rotary valve member 164 having two ports or ways 165. This valve member 164 makes a complete rotation and in one position shown in Fig. 21 of the drawing, it connects the air supply 151 through the pipe 152 with the pipe 26 and simultaneously connects the pipe 25 with the exhaust or outlet pipe 157. As a consequence, the piston 19 is moved in the direction to open the valve 17. The next position of the rotary member 164 connects the pipe 152 with the piping 25 and also connects the piping 25 with the outlet pipe 157, this effects the movement of the piston 19 in the opposite direction. Of course the valve $b$ being constructed like the valve $a$ operates to shift the piston 19 in the cylinder 20 in opposite directions. The valve $c$ connecting with the piping 15 and 16 acts to shift the piston 13 in opposite directions and consequently oscillates the valve shaft 7.

The valves $d$ and $e$ are alike but are different from the valves $a$, $b$ and $c$. Only the valve $d$ will be described, but this description will also apply to the valve $c$. This valve $d$ comprises a casing 166 having the pipes 155 and 160 connected to opposite sides thereof while a pipe 166$^a$ leads from the valve chamber 162 to one of the feed chambers 3 or 4 discharging into the latter at 164$^a$ above the material contained in said chambers. Within the casing 162 is a rotary valve member 166$^b$ having two ports 166$^c$ which are adapted to connect the piping 166$^a$ either with an inlet piping 155 or the piping 160. Of course, the other valve $e$ connects with the other chamber 3 or 4.

The valves $a$, $b$, $c$, $d$ and $e$ are so controlled that, when one of the chambers 3 or 4 has discharged its contents, through the feeding passages 5, the charging valve 16 or 17 of the other chamber 3 or 4 will close, the said other chamber being at this time filled with the material to be molded. About this time, the air pressure will be admitted to the filled chamber and the valve shaft 7 will be turned to connect the filled chamber 3 or 4 with the passageways 5$^a$. After the turning of this valve shaft 7, the air will be cut off and exhausted by one of the valves $d$ or $e$ to the depleted feeding chamber 3 or 4 and the charging valves 16$^a$ or 17 of said chamber will be opened to permit a recharging of the depleted chamber from the hopper 1. This action is continuous so long as the machine is in operation, thereby, maintaining a constant flow of the material to be molded through the passageways 5.

A by-pass 210 connects the pipe 151 with the pipe 159 in advance of the pipes 155 and 156 so that the valves $e$ and $d$ controlling the air pressure in chambers 3 and 4 may be cut out, this by-pass being controlled by a three way valve 211$^a$. This arrangement makes it possible to operate the machine without pressure in the feeding chambers. A valve cutoff 210$^a$ may be arranged to cut out the valve $c$ when the valve shaft 7 is disconnected from its operating piston 14 to permit the valve 6$^c$ to operate automatically.

The control of the valves $a$, $b$, $c$, $d$ and $e$ is preferably effected through a common controlling means comprising, in this instance, a shaft 166 which is driven in a manner to be described, and which carries a bevelled gear 167 meshing with a bevelled gear 168 on a vertical shaft 169 which carries a worm 170 meshing with the worm wheel 171 on a shaft 172 extending parallel with the line of valves $a$, $b$, $c$, $d$ and $e$. On this shaft 172 are clamped arms 173 some which carry two actuating fingers 174 and others of which carry only one of said fingers 174. In this instance, each of these actuating fingers is pivoted at 175 to an arm 173 and is held against the stop 176 by a spring 177 which permits the finger to yield in one direction. These actuating fingers cooperate with a number of ratchet wheels 178 and 179. The ratchet wheels are of two distinct types, the former having eight teeth and the latter having four teeth. The eight teeth are provided on the stems of the valve members 164 while the four toothed wheels are provided on the stems of the valve members 166$^b$. The eight-toothed ratchet wheels are engaged by the two pawls or fingers 174 mounted on a single arm 173, while the four-toothed ratchet wheels are operated by the single-toothed carrying arms. The ratchet wheels 178 and 179 are not shifted entirely by the teeth 174. These teeth 174 merely initiate the movement of the ratchet wheels 178 and 179. The teeth 174 travel too slowly to effect a quick movement of the valves $a$, $b$, $c$, $d$ and $e$ as is desirable. The quick movement is effected through a fast moving shaft 180 carrying a plurality of fingers or teeth 181, one for each of the ratchet wheels 178 and 179. In this instance, each of these teeth 181 is pivoted at 182 to a clamp 183 secured to the shaft 180. A spring 184 holds the tooth 181 in operative position while permitting it to be moved away from such position. Operation of the shaft 180 may be effected from a shaft 166 through a sprocket chain 185 passing about a sprocket 186 on the shaft 166 and also about a sprocket wheel 187 on a shaft 180. The pawls or fingers 174 and 181 yield in one direction in order that the valves may be turned by hand to set them in positions for the proper actuation of the valves.

In the operation of this controlling mechanism, the movement initiating teeth 174, which travel slowly, shift the ratchet wheels 178 and 179 in the proper sequence into the paths of the final actuating teeth 181 on the fast moving shaft 180 so that the complete movements of the toothed wheels are effected by step-by-step movements in proper sequence to cause the functioning of the feeding mechanism in a continuous manner.

With the end in view of separating the feeding mechanism from the molding mechanism, to permit cleaning or repairing of parts of the machine, these two mechanisms are mounted on two separate frames 44 and 180, the frame 189 being mounted on the frame 44 and being movable horizontally on guides 190 formed on the frame 44. Movement of the frame 189 on the frame 44 may be effected by a screw 191 journalled at 192 and 193 on the frame 44 and engaged by a nut 194 on the underside of the frame 189. The turning of this screw by a crank handle 195 on a shaft 196 turns the bevelled gear 197 meshing with the bevelled gear 198 on the screw 191. This arrangement also makes it possible to maintain a tight connection between the feed plate 5 and the mold carrier. It also prevents separation when the candy supply stops.

In the present construction, the shaft 166 which controls the fluid supply also operates the mold oiling mechanism, and to this end, is, through a chain 212 connected to a shaft 216 of the oil pickup drum 127. This shaft 166 is driven from the main drive shaft 51 on the mold supporting frame 44 and, to this end, the shaft 51 has a longitudinally extending groove or keyway 201 in which an internal key on a worm 202 is adapted to engage. This worm in turn meshes with the worm wheel 203, the shaft of which carries a gear 204 meshing with a large gear 205 on the shaft 166. This arrangement permits the frame 189 of the feeding mechanism to be shifted on the frame 44 of the molding mechanism without destroying the driving connection between the shaft 51 and the shaft 166.

While the method of changing the temperature of the mold carrier, as illustrated in Figs. 1 to 25 inclusive, will answer in most cases, in some instances, there may be provided an additional novel means for changing the temperature of the mold carrier. This means may also be employed as the sole means for changing the temperature of the mold carrier. In Figs. 26 to 28 inclusive where this means is illustrated, the drum 34$^a$ is mounted to turn on the hollow shaft 42 through means of two drum closing heads 39$^b$ which have bearings 40$^a$ and 41$^a$ turning on the hollow shaft 42, the latter being supported in the main frame 44. This mold carrier is provided with an annular series of passageways 250 arranged between the transverse series of the molds 35. Adjustably secured by screws 251, in the frame 44 at opposite ends of the mold carrier, are two rings 252 which are adapted to be held by the screws 251 in fluid tight connection with the ends of the mold carrier 34$^a$. Each of these rings is provided with two chambers 253 and 254 which are elongated and open toward the mold carrier ends so that each chamber will communicate with a plurality of the transverse passageways 250. Pipes 255 connect with the chambers 253 while pipes 256 connect with the chambers 254. When the machine is running during the candy molding operations, steam or other heated fluid is admitted in one of the pipes 255 and is exhausted from the other, so that as the passages 250 pass the chambers 253, the heated fluid will pass through said passages 250 and heat the adjacent portions of the mold carrier. The chambers 253 extend from a point adjacent the stripper 122 substantially to the point where the pressers 62 cooperate with the molds so that the mold carrier is heated from a point just prior to the candy being fed to the molds and substantially to a point adjacent the pressers to cooperate with the candy, thus preventing the chilling of the candy during this period. The chambers 254 extend from a point adjacent the pressers 62 substantially to the stripper 122 and the pipes 256 are utilized for admitting to and exhausting from such chambers 254 a cold fluid such as air or water, thus permitting the chilling of the candy as the latter passes from the pressers from the ejecting or discharging point. For the preliminary heating of the mold carrier a hot fluid may be passed through the pipes 255 and 256 so as to bring the temperature of the mold carrier up to the desired point for working on candy and, thereafter, the hot fluid through the pipes 256 may be discontinued, and a cold fluid substituted so that there is a local heating point in the travel of the mold carrier and a local cooling point in such travel.

The operation of the invention will be understood from the foregoing description so that only a summary of the operation will be given. Before any candy is placed in the hopper, the hopper is heated to the temperature of about 200° Fahr. which is above that of the hot candy placed in the hopper and then the mold carrier or drum is heated. Hot candy is now deposited in the hopper 1, one of the charging valves 16 or 17 being open and the feed valve common to the feeding chambers 3 and 4 opening the closed chamber to the discharge passage or feeding passages 5 and closing the other feeding chamber to said passages 5. The open charge valve is now shifted to closed position and thereafter the other charge valve is opened. The feeding valve now opens the charge feeding chamber 3 or 4 to the feeding passages 5$^a$ so that the hot candy passes through the feeding passages 5$^a$ to the molds in the mold carrier under air pressure admitted through the port 164$^a$ in the charge feeding chamber. The heat from the candy after the initial heating is sufficient to maintain the mold carrier in a heated condition without the use of any heating device. The amount of candy entering the pockets or molds in the mold carrier is determined by the adjustment of the roll 107 which cooperates with the inner ends of the plungers secured to the bottom members of the molds. After the molds pass from the feeding mechanism, they pass to the molding pressers. These pressers cooperate with the tops of the molds, being adjustable to obtain any desired pressure on the candy in the molds. After such cooperation is established the pressers travel a short distance with the mold carrier to permit the candy to set or harden while under pressure. To assist in the hardening of the candy, the latter is cooled while traveling from the pressers to the ejecting point. The interior cooling means subjects the inner periphery of the mold carrier to a cold air shortly prior to the engagement of the candy by the pressers, this being effected through the internal drum 145 supplied with air through the hollow shaft 42 of the mold drum or carrier. After the candy leaves the pressure applying means, it may be subjected to a cooling action on the outside of the drum through air from the air chamber 135. This latter air cooling means has its discharge directed toward the perimeter of the drum adjacent the point of ejection of the candy by the roller 16 so that this discharging air can be utilized for chilling and cooling the candy as it is discharged from the molds. For insuring the displacement of the candy from the mold carrier, after the candy has been ejected by the ejecting means, the stripper 122 comes into operation and positively displaces the candy which has been projected by the ejector, injury to the candy being prevented by the resilient candy engaging portions of the stripper. Shortly after the stripper operates over the mold carrier and before the latter again reaches the feeding mechanism, an oiling mechanism applies oil to the pockets of the mold, preferably through a spraying means which insures all portions of the mold pockets being coated with the oil prior to their again receiving candy from the feeding passages 5. During the movement of the mold carrier, the feed chambers 3 and 4 alternately are automatically charged with the hot candy and are automatically opened by their common feed valve to the discharge passages 5, this control being automatically effected through the valves $a$, $b$, $c$, $d$ and $e$.

While the invention is herein particularly described in connection with a machine for molding candy, it is apparent that the invention is not limited to this use.

What I claim as my invention and desire to secure by Letters Patent is:

1. A molding machine comprising a mold carrier movable in an endless path and provided with mold pockets arranged in a plurality of series extending transversely of the line of movement of the carrier, guides on the opposite side of the mold carrier, a crosshead, a series of pressers carried by said crosshead to cooperate with a series of mold pockets on the mold carrier, means for oscillating the crosshead over the mold carrier means for effecting the movement of the crosshead toward and from the mold carrier to cause the pressers to cooperate with the mold pockets, and means on the crosshead for engaging with the guides on the mold carrier to center the crosshead as it travels toward the mold carrier.

2. A molding machine comprising a rotary drum having mold pockets, means for producing continuous rotation of the drum in one direction, a frame mounted to oscillate over the drum about the axis of turning of the drum, a presser carrier movable on the frame on a line radial to the axis of turning of the rotary drum, a presser movable on the carrier, a shaft parallel with but to one side of the axis of turning of the drum, two cams on the shaft, a rigid arm on the frame connecting one of said cams with the oscillatory frame to effect the oscillation of the latter, and means connecting the other of said cams with the presser carrier to effect the movement of the presser carrier toward and from the drum.

3. A molding machine comprising a rotary drum having mold pockets in the perimeter thereof arranged in transverse series, means for producing a continuous rotation of the drum in one direction, a carriage mounted to oscillate over the drum, presser carrying crossheads slidable on the carriage, each on a line radial to the axis of the drum, a guide member movable on the carriage, a link pivotally connected to the guide member and one of the crossheads, and links pivoted to the first mentioned link and to the other crossheads.

4. A molding machine comprising a mold carrier movable in an endless path and having mold pockets arranged in parallel series transversely of the line of movement of the carrier, a carriage mounted to oscillate over the carrier, a frame pivoted to the carriage, pressers mounted to reciprocate on the frame, means for oscillating the carriage, means for reciprocating the pressers on the frame, and means for holding the frame against movement on the carriage, said means being releasable to permit the frame to be swung to carry the pressers away from the carriage.

5. A molding machine comprising a mold carrier movable in an endless path and having a plurality of molds arranged in parallel series extending transversely of the links of movement of the mold carrier, a carriage movable back and forth over the mold carrier, a frame movable on said carriage and having guiding means thereon, a presser carrying a crosshead movable on said guiding means, means for moving the carriage back and forth over the mold carrier, means for moving the crosshead toward and from the mold carrier on said guiding means, said means having included therein a releasable device permitting disconnection between the crosshead and its moving means, means for locking the cross head against movement on the guiding means, and means for releasably holding the frame in inoperative position against movement on the carrier.

6. A candy molding machine comprising a mold carrier having molding pockets, means for feeding hot candy to the pockets, an ejecting means for ejecting the candy from the pockets, and stationary means for directing a blast of air on the candy adjacent said ejecting means for cooling the candy as the latter is being ejected by the ejecting means from the mold pockets.

7. A candy molding machine comprising a mold carrier movable in an endless path and provided with mold pockets, means for feeding the hot candy to the mold pockets, an ejecting means for ejecting the candy from the mold pockets, and means for providing a chamber for a cold blast between the feeding means and the ejecting means, said chamber having a discharge portion adjacent the ejecting means directing the air against the mold carrier to cool the candy ejected by such ejecting means.

8. In a hard candy molding machine, the combination with a mold carrier having mold pockets, of a feeding mechanism embodying two feeding chambers, means providing a single feed passage connecting with both chambers and leading to the mold carrier, and common means for connecting either of said chambers with the feed passage before the other is closed but while closing the connection of the other chamber with the feed passage.

9. In a molding machine, the combination with a mold carrier, of a feeding mechanism for feeding material to the carrier comprising two feeding chambers, means providing a passage having communication with both chambers and leading to the mold carrier, valve means for connecting either of said chambers with the passage, means for controlling said last named means, means for closing either of said chambers, means for effecting the operation of said closing means, means for creating an air pressure in either of said feeding chambers, and a common controlling means for the valve means and the closure means and the air pressure means having provision for closing one feeding chamber, connecting such feeding chamber, with the feeding passage, creating a pressure in the chamber while the chamber is closed, discontinuing the air pressure in the other feed chamber, closing said other feed chamber to the feeding passage and opening said other feed chamber to receive another charge of the material to be fed.

10. In a molding machine, the combination with a mold carrier, of a feeding mechanism providing two feeding chambers, means providing a passage connecting said chambers with the mold carrier, a movable valve controlling said passage, motor operated means for moving said valve to one position to connect one of the chambers with the passage and to another position to connect the other chamber with the feeding passage, means permitting said valve to be disconnected from the motor operated valve moving means to permit the independent movement of the valve.

11. In a hard candy molding machine, the combination with a mold carrier, of a feeding mechanism for feeding material to the mold carrier comprising two feeding chambers, means providing a passage communicating with both chambers and leading to the mold carrier, and common mechanism for cutting off either chamber to the passage and opening the other to said passage before the first mentioned chamber is closed.

12. A hard candy molding machine comprising a hollow rotary drum having mold pockets in the perimeter thereof, means for feeding hot candy to said pockets in a crystallized condition, means for compressing the candy in the pockets before it has become crystallized, and means for creating a circulation of cold air over the inner face of the drum.

13. A hard candy molding machine comprising a hollow rotary drum having mold pockets in the perimeter thereof, mold bottoms movable in the pockets and having portions extending through the drum to the inner face thereof, means for feeding hot candy to the mold in a non-crystallized condition, means for compressing the candy in the molds before it is crystallized, and means for cooling the interior of the drum so that the cooling medium cools the projecting portions of the mold bottoms to effect the cooling of such mold bottoms.

14. A machine for molding hard candy comprising a series of molds movable in an endless path, and means for feeding hot flowing candy to the molds having provision for holding the candy in a hot flowing non-crystallized state until its delivery to the molds and means for compressing the material in the molds before crystallization takes place.

15. A machine for molding hard candy comprising a chamber for hot candy, a series of molds movable in an endless path, a discharge leading from the candy chamber to the molds, means for heating the chamber and the discharge to prevent the cooling of the candy in the chamber and in the discharge to start crystallization, and means for producing a pressure on the top of the hot candy in the chamber to force the candy to flow from the chamber through the discharge and into the molds without producing any working of the candy and means for compressing the candy in the molds before crystallization takes place.

16. A machine for molding hard candy comprising a series of molds movable in an endless path, and means for feeding hot flowing candy through the molds embodying two chambers, a common discharge for said chambers, and heating means for the chambers and the discharge to maintain the candy in the hot non-crystallized condition while passing to the molds and means for compressing the candy in the molds before crystallization takes place.

17. A machine for molding hard candy comprising a series of molds movable in an endless path, and means for feeding hot flowing non-crystallized candy through the molds embodying two chambers, a common discharge for said chambers, heating means for the chambers and the discharge to maintain the candy in the hot condition while passing to the molds, and a common valve means controlling the flow from the two chambers and constructed to open one chamber to the discharge before the other chamber is closed thereto so that a continuous flow through the discharge may be maintained and means for compressing the candy in the molds before crystallization takes place.

18. A machine for molding hard candy comprising, a series of molds movable in an endless path, and means for feeding hot non-crystallized candy to the molds embodying a plurality of chambers having a common discharge, and a common means for controlling the flow of material through the discharge from the plurality of chambers, said means having provision for maintaining a continuous flow through the discharge when the means is shifted to direct the material from another chamber after one chamber has been feeding the candy and means for compressing the candy in the molds before crystallization takes place.

19. In a machine for molding hard candy, the combination with a series of molds, of means for feeding hot non-crystallized candy to the molds embodying two feed chambers having a common discharge passage, and a single swinging valve arranged to swing in one direction to open one of said chambers to the discharge passage and to close the other chamber and vice versa and means for compressing the candy in the molds before crystallization takes place.

20. In a machine for molding hard candy, the combination with a series of molds, of means for feeding hot non-crystallized candy to the molds embodying two feed chambers having a common discharge passage, and a single swinging valve arranged to swing in one direction to open one of said chambers to the discharge passage and to close the other chamber and vice versa, the valve and the passageways leading from the chambers to the common discharge being pocketless so as not to collect or retard any of the candy in such a manner as to produce crystallization and means for compressing the candy in the molds before crystallization takes place.

21. In a machine for molding hard candy, the combination with a series of molds movable in an endless path, of means for feeding hot non-crystallized candy to the molds embodying a chamber, a discharge leading from the chamber to the molds, the chamber and the discharge being pocketless so as not to collect candy and produce crystallization, and means for creating pressure on the top of the candy to force the candy from the chamber through the discharge and into the molds as the latter passes the discharge and means for compressing the candy in the molds before crystallization takes place.

22. In a hard candy molding machine, the combination with a series of molds movable in an endless path, of means for feeding hot non-crystallized candy to the molds comprising a chamber, a discharge leading from the chamber to the molds, the chamber and the discharge passage being pocketless so as not to collect and retard the flow of the candy and produce crystallization, and means for creating an air pressure on the top of the candy for forcing the same from the chamber through the discharge passage and into the mold and means for compressing the candy in the molds before crystallization takes place.

23. In a hard candy molding machine, the combination with a series of molds movable in an endless path, of means for feeding hot candy to the molds comprising two chambers, a common discharge passage leading from both chambers to the mold, a common means for controlling the flow from the two chambers to the discharge passage and opening one chamber to the passage as the other is closing, means for producing pressure on the candy alternately in said chambers, and means connecting the pressure producing means with the common means which controls the flow from the two chambers so that pressure on the candy in one of the chambers is applied shortly before the pressure on the candy in the other chamber is released in order to maintain a continuous flow through the discharge passage.

24. In a hard candy molding machine, the combination with a series of molds movable in an endless path, of means of feeding hot candy to the molds comprising two chambers, a common discharge leading from both chambers to the mold, air controlled common means for controlling the flow from the two chambers through the discharge and opening one chamber to the passage as the other one is closed, means for producing air pressure alternately on the candy in said chambers, and means connecting said air pressure producing means and the air controlled common means which controls the flow of the candy from the two chambers so that air pressure on the candy in one of the chambers is applied before the air pressure on the candy in the other chamber is released in order to maintain a continuous flow through the discharge passage.

25. In a hard candy molding machine, the combination with a rotary molding drum having molding chambers on the outer face thereof and a hollow center, of a stationary cooling means arranged in the hollow center of the drum and about which the drum rotates.

26. The method of making hard candy pieces of small sizes which comprises feeding under external pressure without agitation hot semi-liquid hard candy material free from crystallization to a small mold having heat absorbing properties, compressing the hot candy before crystallization takes place, and then hardening the candy in the mold to crystallize the same.

27. A hard candy molding machine comprising a mold carrier movable in an endless path and carrying a plurality of mold pockets having movable bottoms, means for feeding hot candy to the mold pockets, means for moving the mold bottoms to eject the candy from the pockets after it has hardened, and an unyielding impact bar arranged in the path of the material ejected from the pockets and having yielding portions for engaging the candy ejected from the pockets.

28. A hard candy molding machine comprising a mold carrier movable in an endless path and carrying a plurality of mold pockets having movable bottoms, means for feeding hot candy to the mold pockets, means for moving the mold bottoms to eject the candy from the pockets after it has hardened, and an unyielding impact bar arranged in the path of the material ejected from the pockets and having a flexible metallic portion for engaging the candy ejected from the pockets, and a yielding support for said metallic portion.

29. The method of making small hard candy pieces by a continuous process which comprises first in heating an endless mold carrier to remove the chill therefrom, thereafter feeding without agitation, hot candy in a semi-liquid condition from a mass to the mold carrier while exerting pressure on the mass of candy being fed, compressing the candy in the molds of the carrier before the candy has crystallized, and cooling the carrier to prevent the accumulation of excessive heat in the mold carrier from the hot candy fed thereto so that the candy may set in the mold carrier after shaping.

30. The method of making small hard candy pieces in a continuous process which comprises in feeding without agitation, hot flowing candy from a mass in a semi-liquid condition under pressure exerted on the mass to molds which will absorb the heat of the candy and which are arranged in a moving endless series, compressing the candy in the molds by pressure before the candy has crystallized, and cooling the molds after the shaping operation to remove the absorbed heat and set the candy.

31. A hard candy molding machine comprising an endless series of molds formed of material to absorb heat from the candy, means for feeding without agitation and under external pressure hot candy in a non-crystallized semi-liquid condition to the endless series of molds, mechanism for shaping the candy in the molds with pressure before the candy has crystallized, and a cooling means for cooling the molds after the shaping operation to reduce the absorbed heat in the molds and set the candy.

32. The method of making small hard candy pieces which consists in feeding hot semi-liquid hard candy material free from crystallization to a mold, under external pressure without agitation, compressing the candy in the mold before it is crystallized, cooling the mold to set the candy, removing the candy from the mold, and subjecting the candy as it passes from the mold and before it comes into contact with any surface to a blast of cold air to provide a hardened surface on the candy.

33. The method of making small hard candy pieces which comprises forcing without agitation into a small heated mold, hot semi-liquid hard candy material free from crystallization from a mass subjected to external pressure, subjecting the candy in the mold to pressure to shape the same before crystallization has taken place, cooling the candy in the mold to set the same, and then ejecting the candy from the mold.

EDWARD S. SAVAGE.